TONE CONTROL CIRCUIT
Filed April 30, 1947
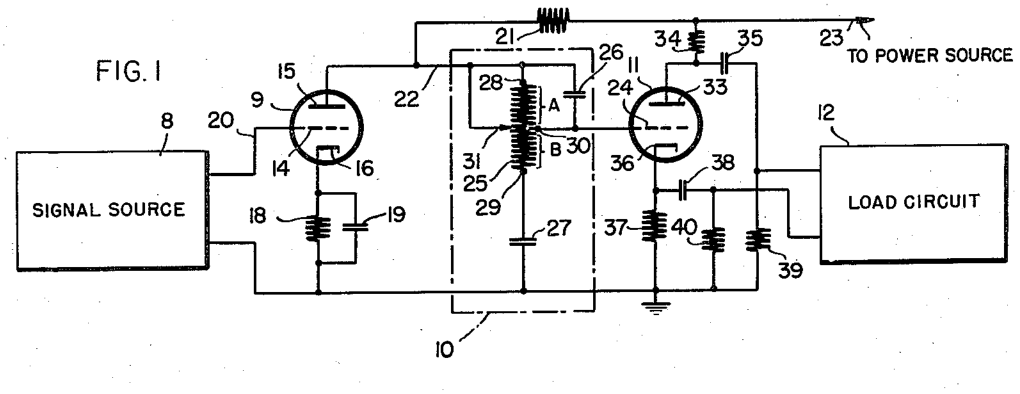
FIG. I
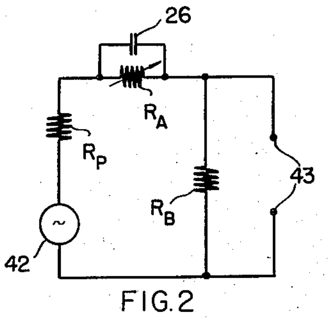
FIG. 2
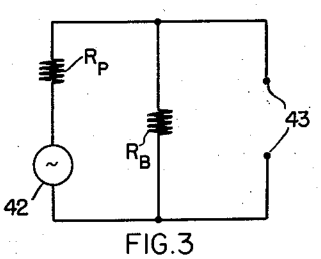
FIG. 3
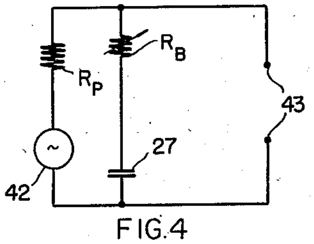
FIG. 4
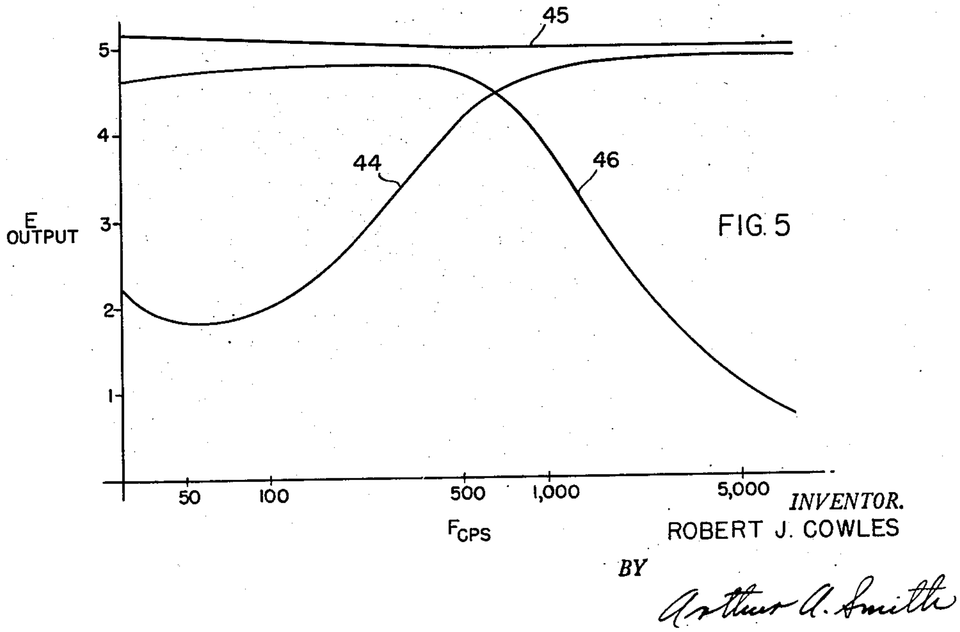
FIG. 5
INVENTOR.
ROBERT J. COWLES
BY
Arthur A. Smith
ATTORNEY Patented Oct. 16, 1951 2,571,112

UNITED STATES PATENT OFFICE 2,571,112

TONE CONTROL CIRCUIT

Robert J. Cowles, Fort Wayne, Ind., assignor, by mesne assignments, to Farnsworth Research Corporation, a corporation of Indiana Application April 30, 1947, Serial No. 744,968

7 Claims. (Cl. 179—171)

This invention relates to tone control circuits and more particularly to a circuit for controlling the high or low frequency response of an amplifier with but a single control.

According to conventional practice, in radio receiver amplifiers and other audio frequency amplifiers, there is provided a manually operated tone control whereby the high frequency or low frequency response of the amplifier may be modified by the operator. The tone control usually modifies the character of the amplifier output to render an acoustic effect which is pleasing to the operator, or may be adjusted for the reduction of hum, hiss or scratch in the output signal.

Various expedients, in the nature of amplifier tone controls, have heretofore been proposed in which a plurality of tone controls and circuits are employed for separately attenuating or accentuating either the high, low or medium frequencies and whereby, for instance, the high frequencies may be attenuated without altering the low frequency response or vice versa. Obviously, the use of a plurality of tone controls and associated circuits may be satisfactory. However, the adjustment thereof may be relatively difficult for the unskilled operator and construction involves relatively complicated and expensive circuit apparatus.

In direct coupled amplifier circuits wherein a first amplifier tube anode is directly connected to the grid of a second amplifier tube, it is conventional to connect a tone control between the tube electrodes. It is known, however, that adjustment of such a tone control results in effecting a change in the grid bias voltage applied to the second amplifier tube. Understandably, the over-all performance of the direct coupled amplifier will then be adversely affected.

The object of the present invention, therefore, is to provide a novel method and means for controlling the frequency response of an audio amplifier with a single relatively simple control circuit.

A further object of the present invention is to provide an inexpensive tone control system which is simple and reliable in operation and which will attenuate one portion of the audio frequency range without appreciably affecting other portions thereof.

Another object of the present invention is to provide a tone control apparatus for direct coupled amplifier circuits wherein grid bias remains constant regardless of the tone control setting.

In accordance with the present invention, there is provided an audio signal amplifier comprising first and second amplifier stages. For controlling the frequency range of amplified signals, there is provided a coupling circuit comprising a first impedance which is resonant in a relatively high frequency range and a second impedance which is resonant in a relatively low frequency range. For adjusting the frequency range of signals, an adjustable means is connected between the first stage and one of said impedances.

For a better understanding of the invention, together with other and further objects thereof, reference is made to the following description, taken in connection with the accompanying drawing and its scope will be pointed out in the appended claims.

In the accompanying drawing:

Fig. 1 is a schematic diagram of an audio amplifying system embodying the tone control circuit of the present invention;

Fig. 2 is the equivalent circuit of the tone control system of the present invention when adjusted for the reproduction of the treble or higher audio frequencies;

Fig. 3 is the equivalent circuit of the tone control system when adjusted for the reproduction of both the high and the low audio frequencies;

Fig. 4 is the equivalent circuit of the tone control system of the present invention when adjusted for the reproduction of the bass or lower audio frequencies; and Fig. 5 is a graph in which curves indicate the over-all audio frequency response of an amplifier embodying the instant invention.

Referring now to Fig. 1 of the drawing, there is shown an audio amplifier circuit comprising a signal source 8, a first amplifier tube 9, a tone control 10, a second amplifier tube 11 and a load circuit 12. The signal source 8 may consist of either the demodulator of a radio broadcast receiver, a phonograph pickup or a microphone, whereas the load circuit 12 may conventionally consist of a push-pull power amplifier for impressing audio signals upon a loud speaker, a phonographic recording head or other suitable device.

The first and second amplifier tubes 9 and 11 are connected to each other in a direct coupled amplifier circuit whereby the audio signals applied to tube 9 by the signal source 8, may be amplified and impressed on tube 11 for further amplification.

The first amplifier tube 9 is provided with a control grid 14, an anode 15, and a cathode 16 which is terminated to ground through a cathode resistor 18. The cathode resistor 18 is also by-passed to ground by a condenser 19. The control grid 14 of the first amplifier tube 9 is connected, by means of a conductor 20, to the output of the signal source 8. The anode 15 of the first amplifier tube 9 is connected through an anode load resistor 21 to a power input terminal 23 whereby to conventionally provide anode operating potential from a power source, not shown. The anode 15 is also connected by means of a conductor 22 to the tone control 10 for applying audio signal energy to a control grid 24 of the second amplifier tube 11.

The tone control 10 consists of a potentiometer 25 and a pair of condensers 26 and 27. The potentiometer 25 is provided with an upper terminal 28, a lower terminal 29, a tap terminal 30 and a slider arm 31. The upper terminal 28, the slider arm 31 and the upper terminal of condenser 26 are each connected through the conductor 22 to the anode 15 for the extraction of audio signal energy therefrom. The lower terminal 29 of potentiometer 25, is coupled to ground through condenser 27 whereas the tap terminal 30 is connected to the lower terminal of condenser 26 and to the grid 24 of tube 11. Understandably, with the slider arm 31 adjusted, as shown, in alignment with the tap terminal 30 the audio signal energy from the anode 15 of tube 9 will be directly impressed upon grid 24 of tube 11 since condenser 26 and portion A of potentiometer 25 are effectively shunted.

The second amplifier tube 11 is also provided with an anode 33 which is connected through an anode load resistor 34 to the power input terminal 23 for operating potential. Anode 33 is also connected through a coupling condenser 35 to the load circuit 12. Cathode 36 in tube 33 is connected to a cathode resistor 37 which is terminated to ground. The audio output signals from the tube 11 are coupled by both the anode circuit and the cathode circuit to the load circuit 12. This audio coupling is achieved in the anode circuit through the coupling condenser 35 and in the cathode circuit by means of a coupling condenser 38. Leak resistors 39 and 40 are conventionally arranged on the output side of the coupling condensers 35 and 38 respectively and are terminated to ground. The operation of the direct coupled amplifier herein illustrated is conventional and explanation thereof is not required.

Consideration will now be given to the tone control 10 and more particularly to the potentiometer 25. Experience has shown that a satisfactory tone controlling effect is obtained with a potentiometer having a total resistive value of 1.0 megohm. This resistive value may preferably be divided by the tap terminal 30 into sections A and B having values of 800,000 ohms and 200,000 ohms, respectively. It is to be noted that terminal 30 provides an input circuit the impedance of which remains fixed regardless of the adjustment of slider arm 31. When the slider arm 31 is arranged in alignment with the tap terminal 30, the slider arm and its connection to conductor 22 short circuits the resistive section A and the condenser 26. It will be noted that movement of the slider arm 31 toward the upper terminal 28 causes an increasingly greater portion of the resistive section A to be inserted between the anode 15 of tube 9 and the control grid 24 of tube 11. At the same time the condenser 26 will shunt that portion of resistive section A which is inserted in this circuit. Inversely, as the slider arm 31 is moved toward the lower terminal 29, it will be apparent that the resistive value of section B will be decreased with respect to the anode circuit of tube 9 and that the reactance of condenser 27 will become effective due to the decreased resistance of section B.

For the purpose of explaining the electrical effects herein achieved, reference is now had to Figs. 2, 3 and 4 of the drawing wherein is shown the equivalent circuits of the tone control apparatus resulting from various settings of the slider arm 31 of the potentiometer 25. There is shown a generator 42 and a resistor $R_p$ which are representative of the function and the plate resistance respectively of the amplifier tube 9. The resistances, $R_a$ and $R_b$ represent the resistive sections A and B respectively of the potentiometer 25. The condenser 26 shunts the resistive section A and the condenser 27 is in series with the resistive section B as shown in Fig. 1. Also shown are output terminals, at point 43 across which appears the audio signal voltage, characteristic of that applied to the grid 24 of the second amplifier tube 11.

Referring to the operation of the tone control 10, assume now that the amplifier circuit is energized and that an audio signal voltage generated by the signal source 8 is applied to the tube 15. The tube 15 amplifies this audio signal and impresses it upon the tube 11 through the tone control 10. For the purpose of attenuating low frequencies the slider arm 31 is adjusted towards the upper terminal 28 to form the circuit shown in Fig. 2 whereby resistance $R_a$ and condenser 26 are apparent between resistance $R_p$ and the output 43. The signal voltage at the output 43 is determined by plate voltage and is attenuated by resistances $R_p$, $R_a$ and $R_b$ in which resistance $R_a$ is shunted, so far as high frequencies are concerned, by the reactance of condenser 26. Effectively, therefore, when the frequency is such that the reactance of condenser 26 is small compared to the resistance $R_a$ there is then no high frequency attenuation caused by resistance $R_a$ or condenser 26. Thus, the output voltages depend only on the relationship of resistances $R_p$ and $R_b$. If, therefore, the value of $R_b$ is large with respect to that of $R_p$, the effective output voltage is comparable at high frequencies to the input voltage. However at low frequencies the resistance $R_a$ is no longer shunted sufficiently to cancel this attenuation and thus, if frequency decreases the voltage output at points 43 will also decrease accordingly. This attenuation of low frequencies is illustrated in Fig. 5 wherein a curve 44 is indicative of the resultant overall frequency response achieved by the equivalent circuit shown in Fig. 2. Fig. 5 illustrates the voltage output E plotted against frequency $f$ and the curve 44 reveals a decided voltage attenuation at low frequencies and negligible voltage attenuation at higher frequencies.

Both the high and the low audio frequencies may be reproduced, without attenuation, by adjusting the slider arm 31 into alignment with the tap terminal 30. The equivalent circuit of this particular arrangement is illustrated in Fig. 3 and the audio frequency response curve achieved is shown by the curve 45 of Fig. 5. It will be apparent from the circuit shown in Fig. 3 that the attenuation of the input voltage, as received at the output terminals 43, is determined purely by the ratio of resistance $R_p$ to the resistance $R_b$ which is shunted across the output terminals.

The condenser 27 has also been omitted from this equivalent circuit since its capacitance is low compared to the resistance $R_b$. Therefore since, as was stated for Fig. 1, the resistance $R_b$ is relatively large compared to resistance $R_p$, there is little effective attenuation at any frequency and, as illustrated by the curve 45, the resultant response curve is relatively linear.

For the purpose of attenuating the high frequencies, the slider arm 31 may be moved towards the lower terminal 29 of potentiometer 25 to thereby provide the equivalent circuit illustrated in Fig. 4. The degree of attenuation obtained is shown by the curve 46 of Fig. 5. The resistive section A and the condenser 26 are now relatively ineffective and they can cause no attenuation since there is no load across them. Therefore, those circuit elements have been eliminated from the equivalent circuit shown in Fig. 4. The attenuation of the input voltage as measured at the output terminals 43 is then determined by resistances $R_p$, $R_b$ and condenser 27. However, since this equivalent circuit portrays the condition existing with the slider arm 31 adjusted to a point below the tap terminal 30, the resistance $R_b$ is therefore reduced from its previous high value to a point at which the reactance of condenser 27 becomes a decided attenuating factor. Since the reactance of condenser 27 will change with the frequency and become higher for the low frequencies, the effective attenuation induced by resistance $R_b$ and condenser 27 is minimized at the low frequencies and is maximum at the higher frequencies. However, the value of $R_b$ and condenser 27 is now relatively low in comparison with the resistive value $R_p$ and therefore the attenuation of the high frequencies is considerable.

It will be apparent therefore, from the curves 44, 45 and 46, shown in Fig. 5, and from the foregoing description that the low frequencies may be attenuated without affecting the high frequencies, that the high frequencies may also be modified without adversely affecting the low frequencies, and finally, that all frequency discrimination may be removed and linearity of response restored. These separate functions are accomplished with but a single control. While the tone control apparatus herein disclosed may have a wide variety of frequency discriminative characteristics, there follow specifications of a particular tone control arrangement which has proven to be particularly satisfactory.

Potentiometer 25, 1.0 megohm { Section A 800 k. ohms; Section B 200 k. ohms }
Condenser 26, 0.002 microfarad
Condenser 27, 0.02 microfarad While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An audio signal amplifier of the direct coupled type comprising a first amplifier stage, a second amplifier stage, a coupling circuit between said stages comprising a first impedance in series between said stages, a second impedance connected in parallel to said first stage, said first impedance in shunt with at least a portion of said second impedance, conductor means connected between said first impedance, said second stage and a fixed predetermined point on said second impedance, and movable contact means connected between said first stage and said second impedance for varying the proportional value of both of said impedances in said coupling circuit.

2. An audio signal amplifier of the direct coupled type comprising a first amplifier stage, a second amplifier stage, a coupling circuit between said stages comprising a capacitive impedance having a high pass characteristic in a first frequency range and in series between said stages, an impedance connected in parallel to said first stage and having a high pass characteristic in a second range of frequencies including said first frequency range, conductor means adapted to carry both alternating current and direct current connected between said first mentioned impedance, said second stage and a fixed predetermined point on said second mentioned impedance, and adjustable means connected between said first stage and said second mentioned impedance.

3. An audio signal amplifier of the direct coupled type comprising a first amplifier stage, a second amplifier stage, a coupling circuit between said stages comprising a relatively high frequency pass impedance in series between said stages, an impedance connected in parallel to said first stage, conductor means adapted to carry both alternating current and direct current connected between said high pass impedance, said second stage and a fixed predetermined point on said second mentioned impedance, and adjustable means connected between said first stage and said second mentioned impedance for varying the effectiveness of said high pass impedance.

4. An audio signal amplifier of the direct coupled type comprising a first amplifier stage, a second amplifier stage, a coupling circuit between said stages comprising a relatively high frequency pass condenser in series between said stages, an impedance connected in parallel to said first stage, conductor means adapted to carry both alternating current and direct current connected between said high pass condenser, said second stage and a fixed predetermined point on said impedance thereby to provide a fixed impedance across the grid of said second stage, and movable contact means connected between said first stage and said impedance and adjustable for varying the effectiveness of both of said condensers.

5. An audio signal amplifier of the direct coupled type comprising a first amplifier stage, a second amplifier stage, a coupling circuit between said stages comprising a relatively high frequency pass condenser in series between said stages, an impedance connected in parallel to said first stage, conductor means adapted to carry both alternating current and direct current connected between said high pass condenser, said second stage and a fixed predetermined point on said impedance thereby to provide a fixed impedance across the grid of said second stage, and movable contact means connected between said first stage and said impedance and adjustable for varying the effectiveness of said high pass condenser.

6. An audio signal amplifier of the direct coupled type comprising a first amplifier stage, a second amplifier stage, a coupling circuit between said stages comprising a relatively high frequency pass condenser in series between said stages, a resistor and condenser connected in series with one another and connected in parallel to said first stage, conductor means adapted to carry both alternating current and direct current connected between said high pass condenser, said second stage and a fixed predetermined point on said resistor thereby to provide a fixed impedance across the grid of said second stage, and movable contact means connected between said first stage and said resistor and adjustable for varying the effectiveness of said high pass condenser.

7. An audio signal amplifier of the direct coupled type comprising a first amplifier stage, a second amplifier stage, a coupling circuit between said stages comprising a relatively high frequency pass condenser in series between said stages, a resistor and condenser connected in series with one another and connected in parallel to said first stage, conductor means adapted to carry both alternating current and direct current connected between said high pass condenser, said second stage and a fixed predetermined point on said resistor thereby to provide a fixed impedance across the grid of said second stage, and movable contact means connected between said first stage and said resistor and adjustable from one end of said resistor to the other for varying the effectiveness of both of said condensers.

ROBERT J. COWLES.

REFERENCES CITED

The following references are of record in the file of this patent:

UNITED STATES PATENTS

| Number | Name | Date |
|---|---|---|
| 1,938,256 | Jacobs | Dec. 5, 1933 |
| 2,192,959 | Ballard | Mar. 12, 1940 |
| 2,225,337 | Fyler | Dec. 17, 1940 |
| 2,322,558 | Bachman | June 22, 1943 |

FOREIGN PATENTS

| Number | Country | Date |
|---|---|---|
| 21,960 | Australia | Aug. 21, 1929 |